US007010042B2

(12) United States Patent
Vissers et al.

(10) Patent No.: US 7,010,042 B2
(45) Date of Patent: Mar. 7, 2006

(54) IMAGE PROCESSOR AND IMAGE DISPLAY APPARATUS PROVIDED WITH SUCH IMAGE PROCESSOR

(75) Inventors: Kornelis Antonius Vissers, Sunnyvale, CA (US); Abraham Karel Riemens, Eindhoven (NL); Robert Jan Schutten, Campbell, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 614 days.

(21) Appl. No.: 10/234,784

(22) Filed: Sep. 4, 2002

(65) Prior Publication Data

US 2003/0091114 A1 May 15, 2003

(30) Foreign Application Priority Data

Sep. 7, 2001 (EP) .................................. 01203383

(51) Int. Cl.
*H04N 7/12* (2006.01)
(52) U.S. Cl. ................................. 375/240.16
(58) Field of Classification Search ............... 348/699, 348/416.1; 375/240.16, 240.17, 240.12, 375/240.15; 382/236, 238; 386/109, 111
See application file for complete search history.

(56) References Cited

U.S. PATENT DOCUMENTS

| 4,864,393 | A  | * | 9/1989 | Harradine et al. ........... 348/699 |
| 6,738,423 | B1 | * | 5/2004 | Lainema et al. ....... 375/240.03 |
| 2002/0012396 | A1 | * | 1/2002 | Pau et al. .............. 375/240.16 |

* cited by examiner

*Primary Examiner*—Vu Le
*Assistant Examiner*—Behrooz Senfi
(74) *Attorney, Agent, or Firm*—Edward W. Goodman

(57) ABSTRACT

The image processor (101) for motion compensated image processing comprises a motion compensation unit (106) for calculating an output image based on a particular motion vector field and based on a first input image and a second input image. The particular motion vector field can be calculated by a motion estimator (104) which is part of the image processor (101) or by an external unit (108). The image processor (101) is designed to select from which source, i.e. the motion estimator (104) or the external unit (108), the particular motion vector field is taken to calculate the output image. The external source is designed to calculate the particular motion vector field based on a motion vector field which was provided by the motion estimator (104) of the image processor (101).

10 Claims, 6 Drawing Sheets

IMAGE PROCESSOR AND IMAGE DISPLAY APPARATUS PROVIDED WITH SUCH IMAGE PROCESSOR

Figure 1A:
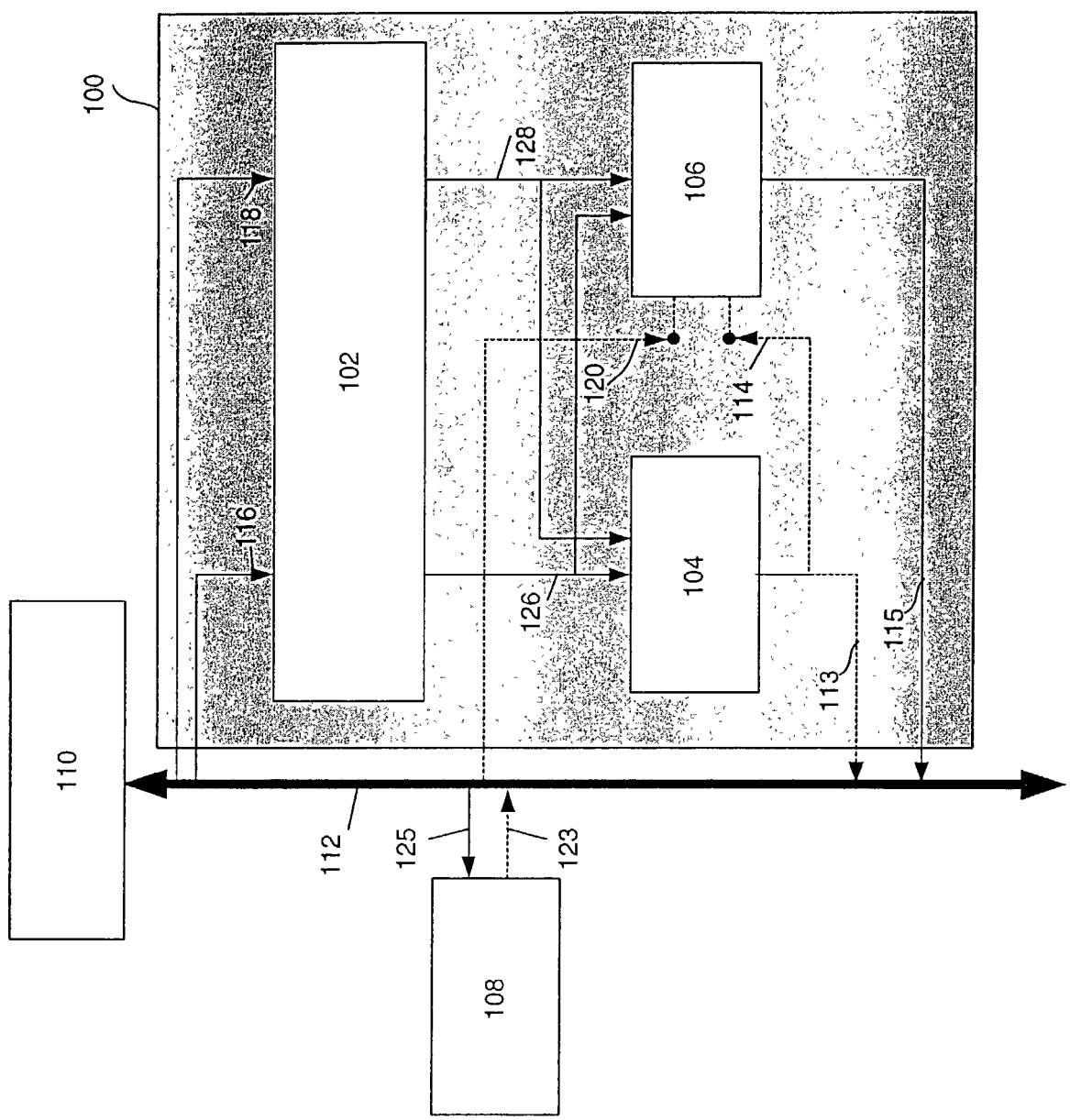

The invention relates to an image processor for motion compensated image processing, comprising:
- a memory unit for storing a first input image and a second input image;
- a motion estimator for estimating a motion vector field based on the first input image and the second input image; and
- a motion compensation unit for calculating an output image based on a further motion vector field and based on the first input image and the second input image.

The invention further relates to an image display apparatus comprising:
- a receiver for receiving a sequence of images comprising a first input image and a second output image;
- an image processor for motion compensated image processing, comprising:
- a memory unit for storing the first input image and the second input image;
- a motion estimator for estimating a motion vector field based on the first input image and the second input image; and
- a motion compensation unit for calculating an output image based on a further motion vector field and based on the first input image and the second input image;
- a display device for displaying the output image.

An embodiment of the image processor of the kind described in the opening paragraph is known from the article "IC for motion-compensated de-interlacing, noise reduction, and picture rate conversion", by G. de Haan, in IEEE Transactions on Consumer Electronics, Vol. 45, No. 3, August 1999.

Image sequences come in various image rates: film material in 24, 25 and 30 Hz and video usually in 50 Hz and 60 Hz. Television displays, on the other hand, are commercially available with image rates of 50, 60 and 100 Hz, and have either progressive or interlaced scanning. Simple image rate converters repeat images until the next image arrives, which results in blur and/or judder when motion occurs. Similarly, de-interlacing sometimes results from repetition, or averaging of neighboring lines. The more advanced de-interlacing concepts apply vertical-temporal processing, but even these degrade those portions of images where motion occurs.

In the cited article it is described that consumer television ICs appeared in the mid-nineties using motion estimation and motion compensation to achieve high performance conversion for even moving sequences. The article shows improved algorithms for motion estimation, motion compensated de-interlacing, motion compensated image interpolation and motion compensated noise reduction. The IC implementing these algorithms comprises a memory unit to cache a current and a previous image, a motion estimator and a motion compensation unit. The working of the IC is as follows. Two consecutive input images are received and cached in the memory unit of the IC. Based on these input images motion vectors are calculated. The set of motion vectors of one image pair, i.e. a current and a previous image, is called a motion vector field. The motion vectors are provided to the motion compensation unit which performs the operations as listed above. The result is a motion compensated output image. The IC performs the operations in real-time. This means that a motion estimation algorithm with a relatively low operation count is implemented. Although the results of the motion estimation unit are relatively good, there can be erroneous motion vectors, resulting in artifacts in the motion compensated images. Especially at the borders of the images or at occlusion areas in the images. More advanced motion estimation is required in these cases.

It is a first object of the invention to provide an image processor of the kind described in the opening paragraph that is designed to enable more advanced motion estimation.

It is a second object of the invention to provide an image display apparatus of the kind described in the opening paragraph with more advanced motion estimation.

The first object of the invention is achieved in that the image processor is designed to selectively receive the further motion vector field from:
- the motion estimator; or from
- an external unit.

The main difference with the image processor of the prior art is that the motion vectors can be calculated by the motion estimator of the image processor itself but that the motion vectors can also be calculated by an external unit, i.e. a source not being part of the processor itself, which is arranged to act as co-processor. It is preferred that this co-processor is designed to perform more advanced motion estimation than the motion estimation of the motion estimator. Notice that the further motion vector field may correspond to the motion vector field calculated by the motion estimator but that it also may be a motion vector field which has been provided by the external unit.

An embodiment of the image processor according to the invention is designed to provide the motion vector field to the external unit which is arranged to calculate the further motion vector field on the basis of the motion vector field. In this embodiment the motion vectors can be exchanged to the external unit which is arranged to act as co-processor to improve the motion vector field which is calculated by the motion estimator of the image processor. The advantage is that the available motion estimator of the image processor is used and the resulted motion vector field is improved by the external unit. The image processor has two modes of operations:

One pass mode: The first input image and the second input image are received and stored in the memory unit of the image processor. Motion vectors are calculated based on these input images. These motion vectors are provided to the motion compensation unit which calculates the motion compensated output image.

Two pass mode: In the first pass of the two passes, the first input image and the second input image are received and stored in the memory unit. Motion vectors are calculated based on these input images. These motion vectors are provided to the external unit. Externally the received motion vector field can be temporarily stored. But most important, the external unit is arranged to perform operations on the motion vector field in order to improve it. In the mean time the image processor can continue with processing other images. E.g. the motion compensation unit of the image processor can calculate a second motion compensated output image or the motion estimator of the image processor can calculate a motion vector field of another image pair. In the second pass of the two passes, the further motion vector field corresponding to the first and second input image are provided to the motion compensation unit together with the first and second input image. Based on this input the output image is calculated.

In the two pass mode the first and the second input image have to be read into the memory unit twice: once for the first pass and once for the second pass. The result is an additional load of the memory bus. However the main advantage of the image processor according to the invention which is designed to alternate between the one pass and the two pass mode is the scalability. It allows to choose between an increased image quality at the cost of some additional bandwidth.

In another embodiment of the image processor according to the invention, in which the motion vector field is provided to the external unit, the external unit is arranged to recalculate a particular motion vector of the motion vector field. Even more advanced adaptations of the motion vector field can be applied. E.g. by using extended sets of candidate motion vectors to find an appropriate motion vector. Motion estimation based on more than two consecutive images also belongs to the possibilities.

An embodiment of the image processor according to the invention, in which the motion vector field is provided to the external unit, comprises a switch with:
- a first input connector that is coupled to the motion estimator;
- a second input connector that is coupled to the external unit; and
- an output connector that is coupled to the motion compensation unit, the switch having:
- a first state in which the first input connector is connected to the output connector; and
- a second state in which the second input connector is connected to the output connector.

The advantage of the switch is that it makes the design of the motion compensation unit relatively easy. The motion compensation unit comprises one interface to which with the appropriate motion vector fields are provided in stead of two interfaces which potentially can provide the further motion vector field.

In an embodiment of the image processor according to the invention, in which the motion vector field is provided to the external unit, the motion estimator comprises a first control interface in order to enable and/or disable the motion estimator. The advantage of the first control interface is that it makes the design of the motion estimator unit relatively easy. A main part of the timing and control of the motion estimator is executed externally to the motion estimator.

In an embodiment of the image processor according to the invention, in which the motion vector field is provided to the external unit, the motion compensation unit comprises a second control interface in order to enable and/or disable the motion compensation unit. The advantage of the second control interface is that it makes the design of the motion compensation unit relatively easy. A main part of the timing and control of the motion compensation unit is executed externally to the motion compensation unit.

In an embodiment of the image processor according to the invention the motion compensation unit is designed to perform at least one of the following operations:

De-interlacing: Common video broadcast signals are interlaced, which implies that successive images contain only the even or only the odd lines alternately. De-interlacing attempts to restore the full vertical resolution, i.e. make both the odd and even lines available for each image;

Temporal image interpolation: From a series of original input images a larger series of output images is calculated. Output images are temporally located between two original input images; and Temporal noise reduction. This can also involve spatial processing, resulting in spatial-temporal noise reduction.

The second object of the invention is achieved in that the image processor of the image display apparatus is designed to select a source from a set of sources, the source providing the further motion vector field to the motion compensation unit and the set of sources comprising:
- the motion estimator; and
- an external unit to which the motion vector field is provided.

Modifications of the image processor and variations thereof may correspond to modifications and variations thereof of the image display apparatus described.

Figure 1B:
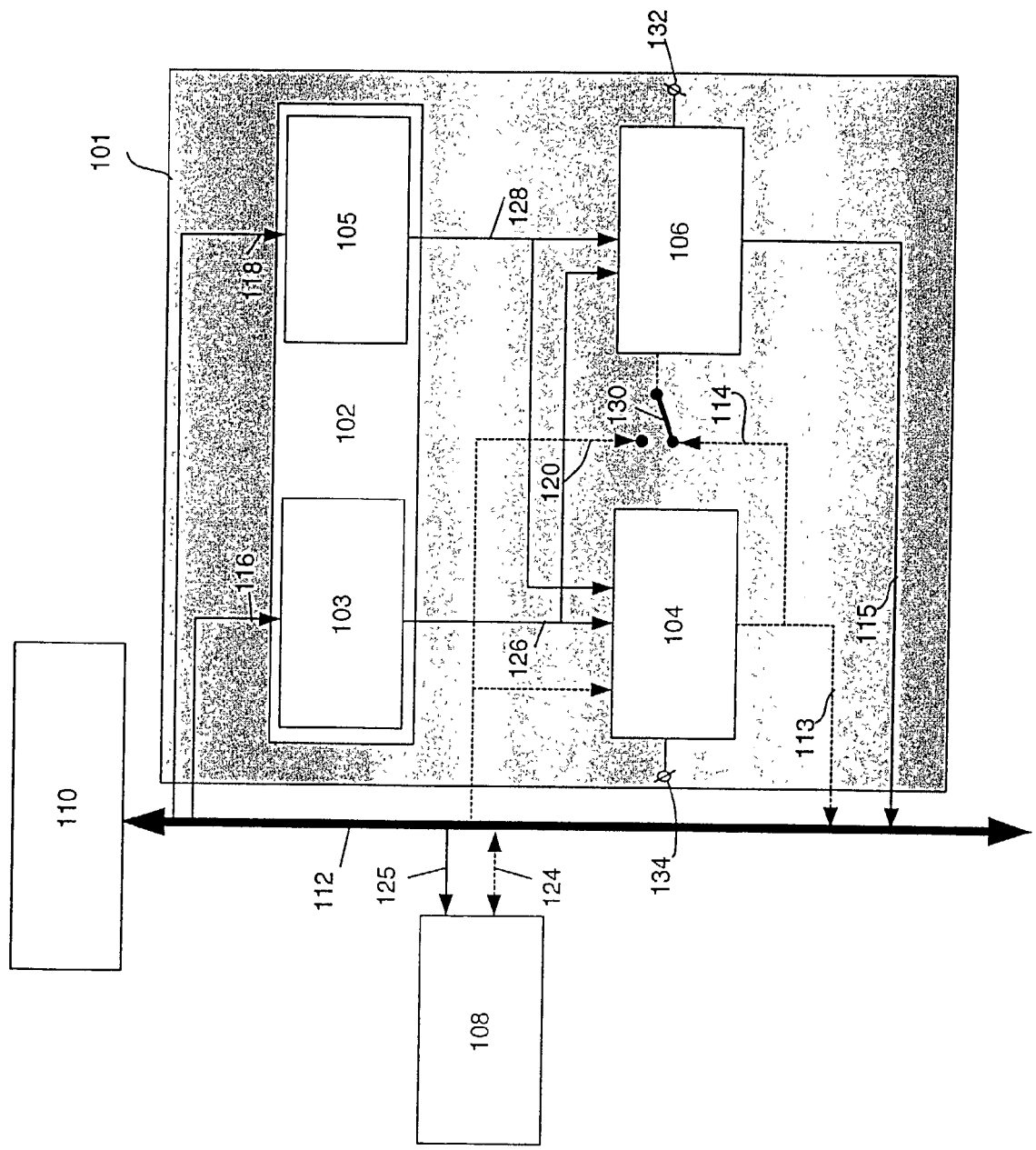
Figure 2:
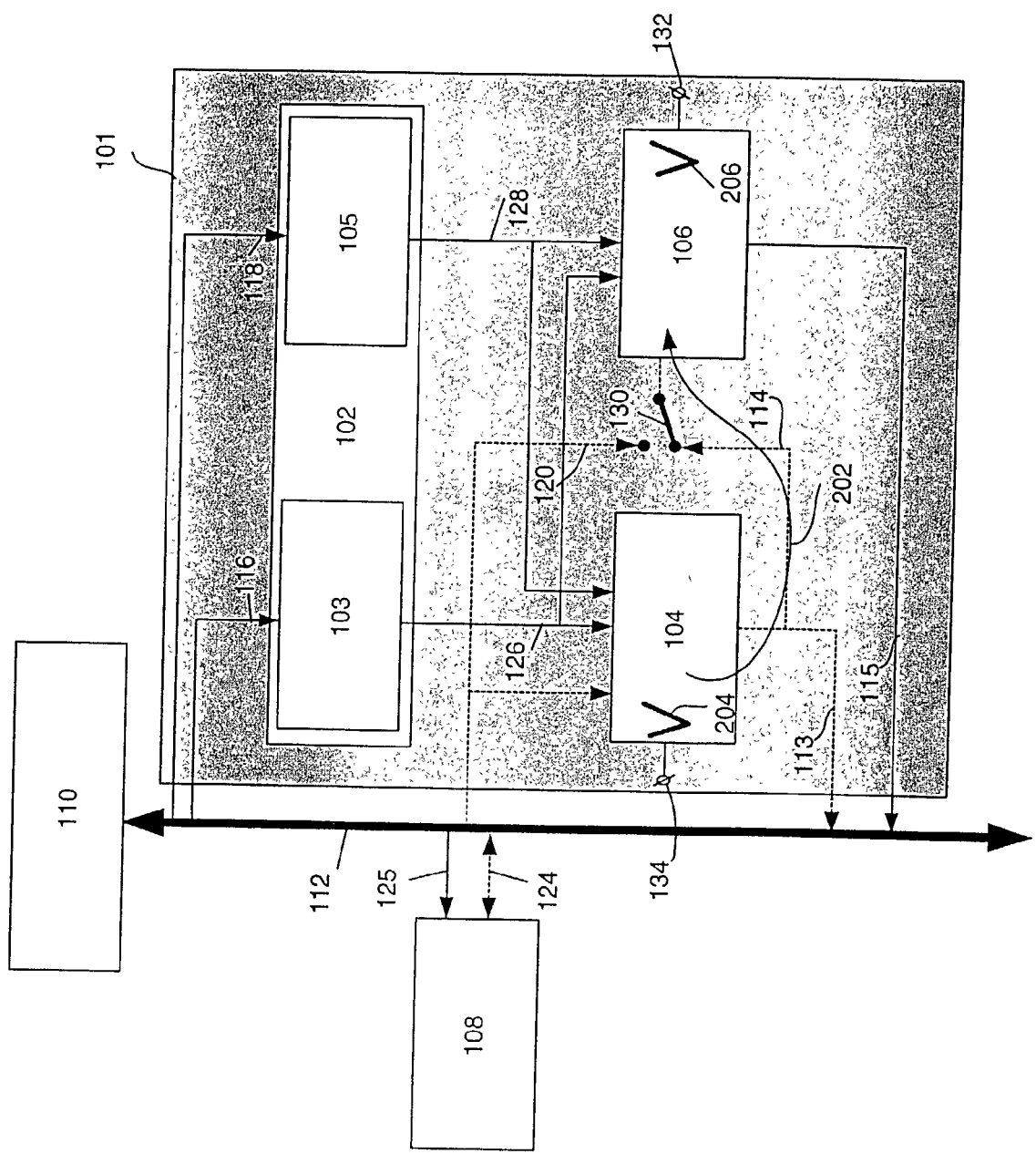
Figure 3A:
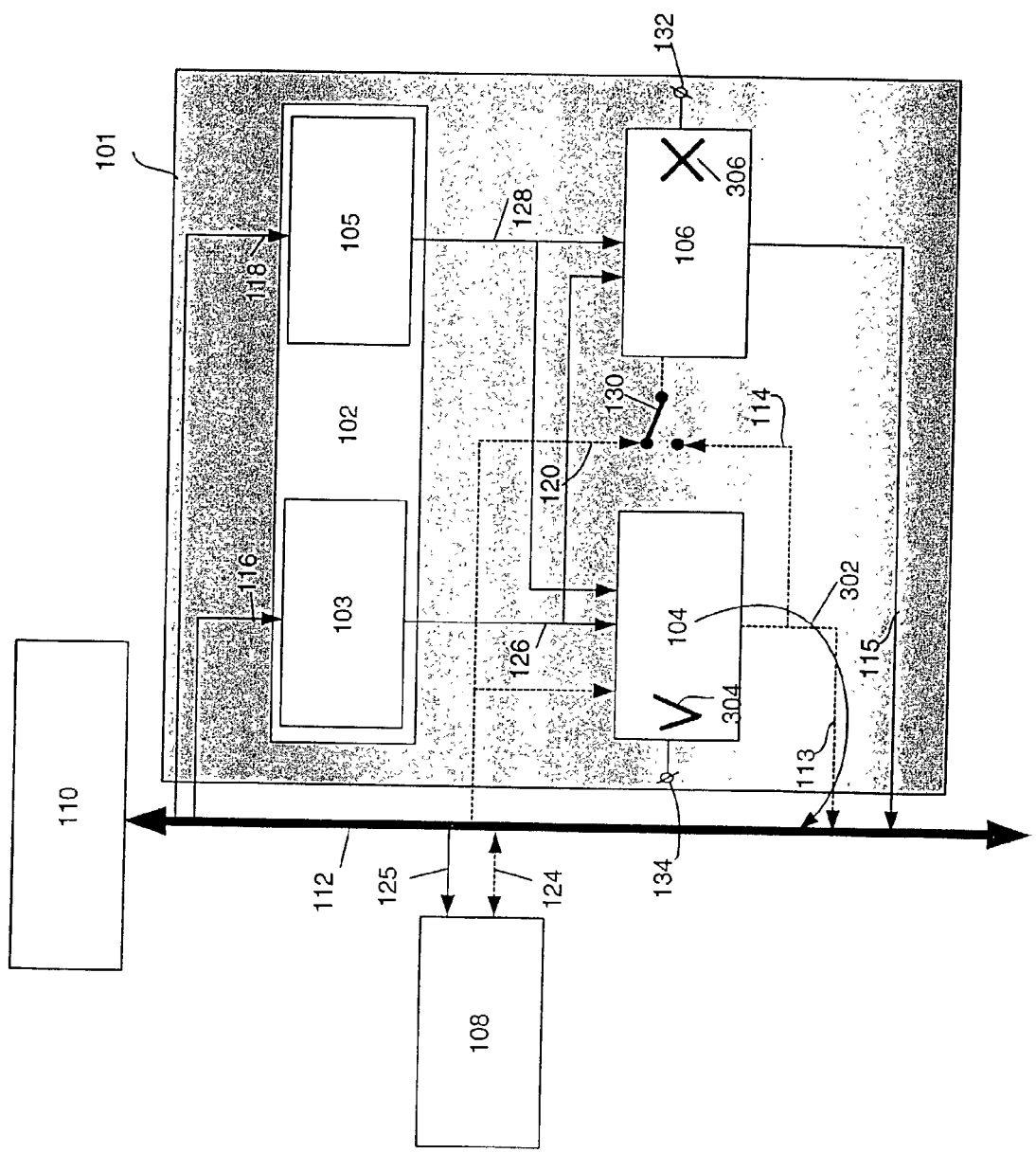
Figure 3B:
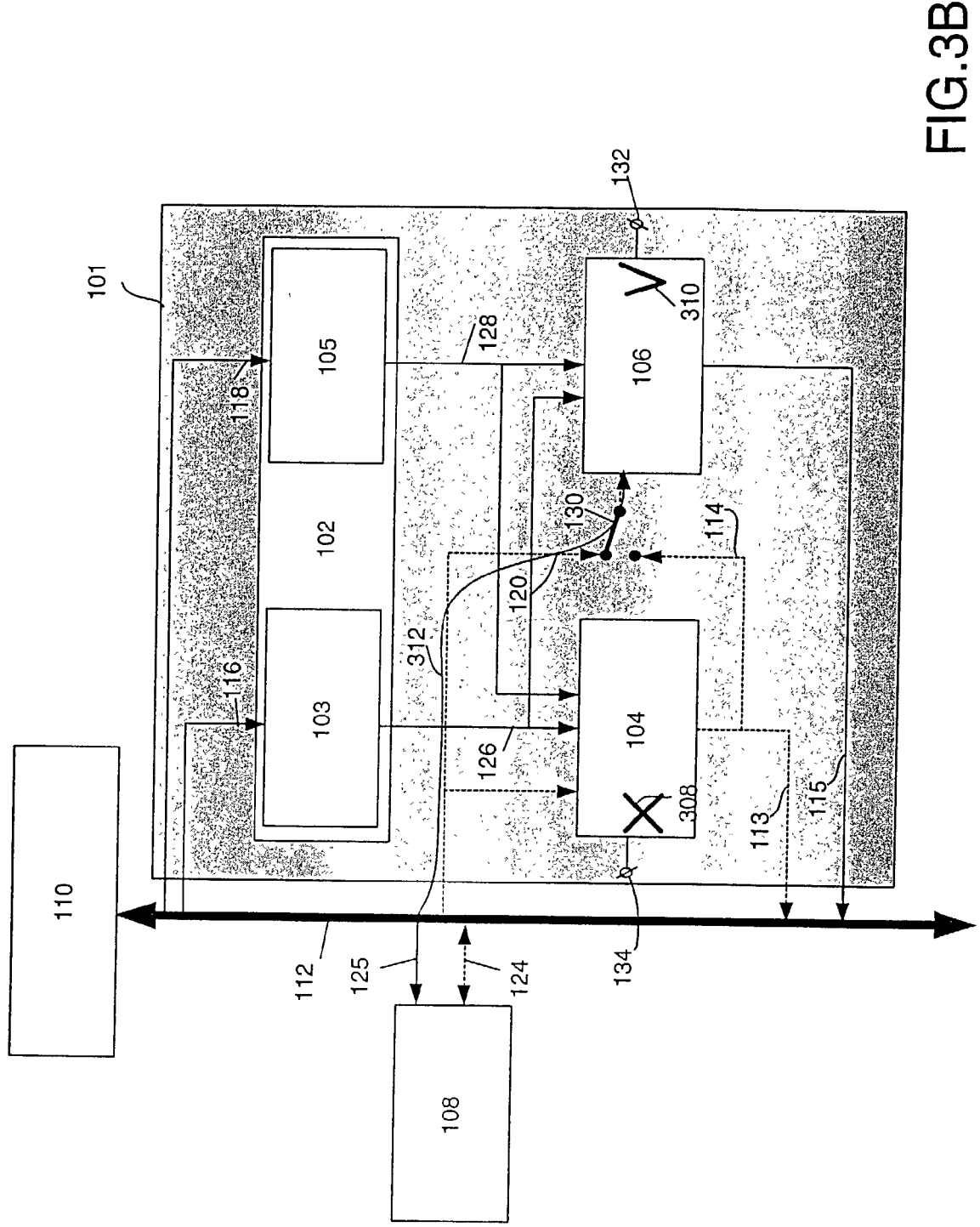
Figure 4:
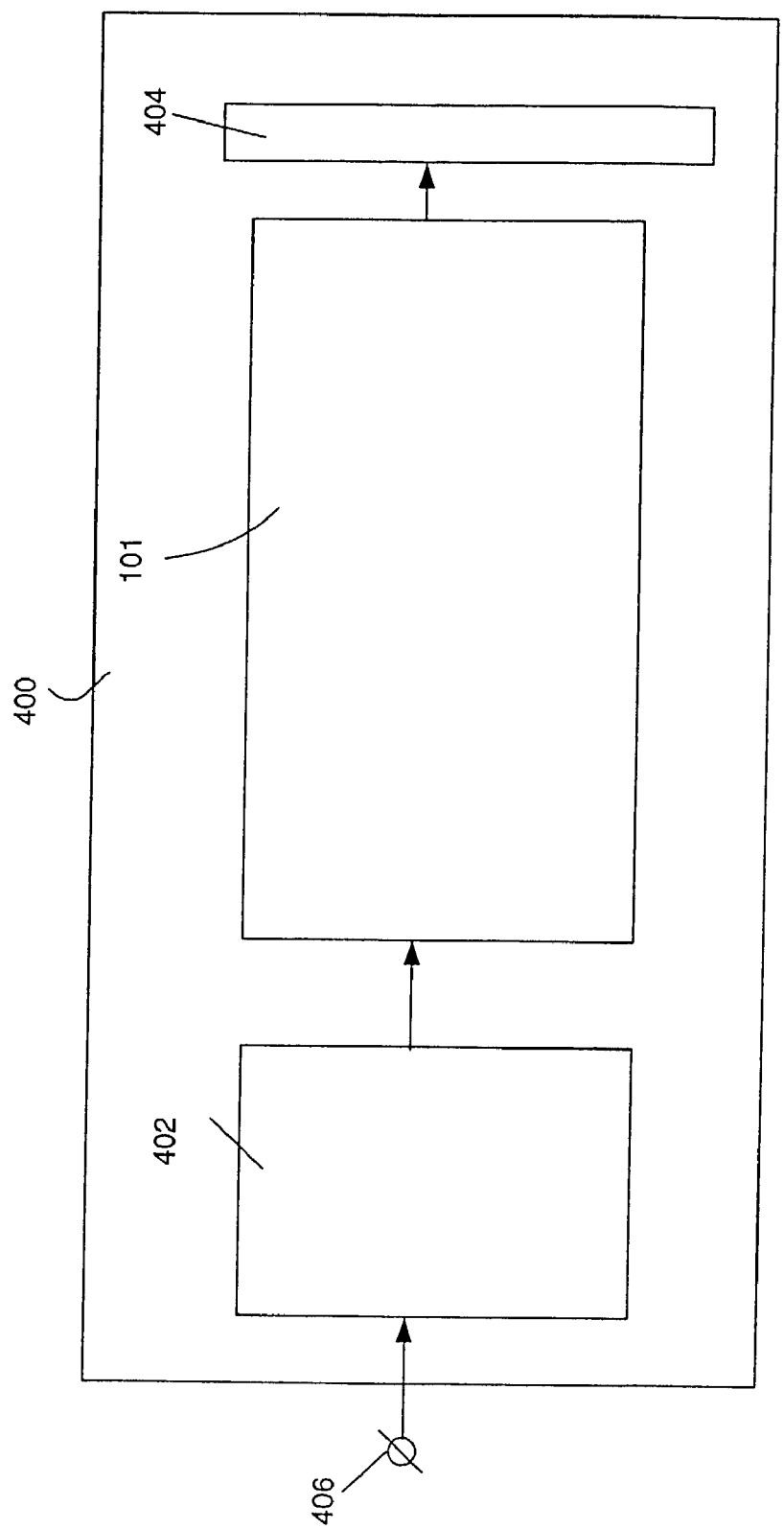

These and other aspects of the image processor and of the image display apparatus according to the invention will become apparent from and will be elucidated with respect to the implementations and embodiments described hereinafter and with reference to the accompanying drawings, wherein:

FIG. 1A schematically shows an embodiment of the image processor in its context;

FIG. 1B schematically shows an embodiment of the image processor comprising a switch to select between motion vectors from the motion estimator or from the external unit;

FIG. 2 schematically shows the data flow of the motion vector field in an embodiment of the image processor running in the one pass mode;

FIG. 3A schematically shows the data flow of the motion vector field in an embodiment of the image processor during the first pass of the two pass mode;

FIG. 3B schematically shows the data flow of the further motion vector field in an embodiment of the image processor during the second pass of the two pass mode; and FIG. 4 schematically shows an image display apparatus according to the invention.

Corresponding reference numerals have the same meaning in all of the Figures.

FIG. 1A schematically shows an embodiment of the image processor 100 in its context. The image processor 100 comprises:
- a memory unit 102 for storing a first input image and a second input image;
- a motion estimator 104 for estimating a motion vector field based on the first input image and the second input image; and
- a motion compensation unit 106 for calculating an output image based on a further motion vector field and based on the first input image and the second input image.

The image processor 100 is designed to select a source from a set of sources, the source providing the further motion vector field to the motion compensation unit 106 and the set of sources comprising:
- the motion estimator 104; and
- an external unit 108.

The data bus 112 is designed to exchange e.g. data of input and output images and motion vectors. To the data bus 112 are connected:
- the image processor 100;
- an external memory device 110 arranged to store e.g. data of input and output images and motion vectors; and
- the external unit 108.

The working of the image processor is as follows. A first and a second input image are retrieved from the external memory device 110 via the data bus 112 and stored in the memory unit 102. It is possible that all pixels of the first and second input image are stored in the memory unit 102 simultaneously. But preferably only a portion of these pixels is simultaneously stored in the memory unit 102. The first and the second input image are exchanged via image data path 116 and image data path 118, respectively. In the case that no motion vector field of this image pair has been calculated before, the first and the second input image are provided to the motion estimator 104. The motion estimator 104 calculates the motion vector field and provides this to the motion compensation unit 106 via motion vector path 114. The first and the second input image are also provided via the image data paths 126 and 128 to the motion compensation unit 106, which calculates the corresponding output image. In the case that a motion vector field of this image pair has been calculated before the further motion vector field is retrieved from the external source 108 and provided to the motion compensation unit 106 via motion vector path 120 together with the first and the second input image. Based on this input the motion compensation unit 106 calculates the corresponding output image. The output image is exchanged via image data path 115. Image data is provided to the external unit 108 via image data path 125 and motion vectors are retrieved from the external unit 108 via motion vector path 123. The motion compensation unit 106 is designed to perform at least one of the following operations:

de-interlacing;

temporal image interpolation; or temporal noise reduction.

Preferably the motion estimator 104 and of the motion compensation unit 106 operate according to algorithms as described in the article "IC for motion-compensated de-interlacing, noise reduction, and picture rate conversion", by G. de Haan, in IEEE Transactions on Consumer Electronics, Vol. 45, No. 3, August 1999. Optionally the de-interlacing is performed in accordance with another method as described in "De-interlacing—An Overview" by G. de Haan, in proceedings of the IEEE, Vol. 86, No. 9, September 1998.

It is preferred that the image processor is implemented on one IC. Alternatively, the image processor is implemented with multiple ICs which are interconnected with connections which have a relatively large bandwidth.

FIG. 1B schematically shows an embodiment of the image processor 101 comprising a switch 130 with:

a first input connector that is coupled to the motion estimator 104 via motion vector path 114;

a second input connector that is coupled to the external unit 108 via motion vector path 120; and an output connector that is coupled to the motion compensation unit 106, and the switch (130) having:

a first state in which the first input connector is connected to the output connector, enabling the further motion vector field to be provided directly from the motion estimator 104 to the motion compensation unit 106; and a second state in which the second input connector is connected to the output connector enabling the further motion vector field to be provided from the external unit 108 to the motion compensation unit 106.

The motion estimator 104 comprises a first control interface 134 in order to enable and/or disable the motion estimator 104 and the motion compensation unit 106 comprises a second control interface 132 in order to enable and/or disable the motion compensation unit 106. A main part of the timing and control of the motion estimator 104 and of the motion compensation unit 106 is executed externally to these units 104,106.

The memory unit 102 comprises a first sub-unit 103 for storing the first input image and a second sub-unit 105 for storing the second input image.

The image processor 101 is arranged to exchange the motion vector field from the motion estimator 104 to the external unit 108 via the motion vector paths 113 respectively 124.

In connection with FIG. 2, FIG. 3A and FIG. 3B it will be described under which conditions the switch is in the first or the second state and whether the motion estimator 104 and motion compensation unit 106 are enabled or disabled. This is summarized in Table 1.

TABLE 1

|  | One pass (see FIG. 2) | First pass of two passes (see FIG. 3A) | Second pass of two passes (see FIG. 3B) |
| --- | --- | --- | --- |
| motion estimator 104 | Enabled | Enabled | Disabled |
| motion compensation unit 106 | Enabled | Disabled | Enabled |
| Switch 130 | First state | Second state | Second state |

FIG. 2 schematically shows the data flow 202 of the motion vector field in an embodiment of the image processor 101 running in the one pass mode. Both the motion estimator 104 and the motion compensation unit 106 are enabled as indicated with check marks 204 and 206. The switch 130 is in the first state. The sequence of processing steps is as follows. The first input image and the second input image are received from the external memory device 110 and cached in the memory unit 102 of the image processor 101. The first image, i.e. the so-called previous image, is put in sub-unit 103 and the second input image, i.e. the so-called previous image is put in sub-unit 105. The images are divided in multiple segments. For each of the segments a motion vector is calculated. All vectors of one image together form a motion vector field. These motion vectors are directly provided to the motion compensation unit 106, which calculates the motion compensated output image. In principle, the motion vectors are provided one by one or in small sets. But eventually the complete motion vector field is provided. The advantage of providing the motion vectors one by one is that the motion compensation unit 106 can complete the output image relatively short after the last motion vector has been calculated. Another advantage is that no memory space is required in the image processor 101 to store the complete motion vector field. Typically the motion vectors are also stored in the external memory device 110.

FIG. 3A schematically shows the data flow 302 of the motion vector field in an embodiment of the image processor 101 during the first pass of the two pass mode. The motion estimator 104 is enabled and the motion compensation unit 106 is disabled as indicated with reference numerals 304 and 306. The switch 130 is in the second state. However the state of the switch 130 is not relevant because the motion compensation unit 106 is disabled. The sequence of processing steps is as follows. The first input image and the second input image are received from the external memory device 110 and cached in the memory unit 102 of the image processor 101. The images are divided in multiple segments. For each of the segments a motion vector is calculated. These motion vectors are temporarily stored in the external memory device 110. The external unit 108 can access these motion vectors. The external unit 108 is designed to calculate a further motion vector field, optionally based on the motion vectors being calculated by the motion estimator 104. The further motion vector field calculated by the external unit 108 will be used by the image processor 101 in the second pass. Optionally this further motion vector field is also stored in the external memory device 110.

FIG. 3B schematically shows the data flow 312 of the further motion vector field in an embodiment of the image processor 101 during the second pass of the two pass mode. The motion estimator 104 is disabled and the motion compensation unit 106 is enabled as indicated with reference numerals 308 and 310. The switch 130 is in the second state. The sequence of processing steps is as follows. The first input image and the second input image are received from the external memory device 110 and cached in the memory unit 102 of the image processor 101. The particular motion vectors corresponding to the first and second input image are provided by the external source 108 or retrieved from the external memory 110. The motion compensation unit 106 calculates the output image. The scanning direction, i.e. the sequence of segments being processed, during the second pass is independent of the scanning direction during the first pass. In other words, during the first pass motion vectors can be calculated for segments from bottom-right to top-left of the image while during the second pass the motion compensated output image can be created by processing segments from e.g. top-left to bottom-right. This allows alternating the scanning directions of the motion estimator, which increases the convergenge speed of the algorithms, while the motion compensation always applies the same scanning direction.

The external unit 108 and the image processor 101 are both designed to calculate motion vectors that are related to the same sequence of images. The image processor 101 is designed to calculate a first motion vector field of a particular image pair during a first time slot. The external unit 108 is arranged to calculate a second motion vector field of the particular image pair during a second time slot based on the first motion vector field. In a third time slot the second motion vector field will be used by the motion compensation unit 106 of the image processor 101 to calculate an output image. However the external unit 108 and the image processor 101 are processors which run in parallel. The effect of the parallel processing is illustrated with an example. The example is summarized in Table 2.

TABLE 2

| | Image processor 101 | |
| Time slot | external unit 108 | motion estimator 104 | motion compensation unit 106 |
|---|---|---|---|
| 1 | $F_2(N-1,N)$ | $F_1(N,N+1)$ | — |
| 2 | $F_2(N,N+1)$ | — | $F_2(N-1,N)$ |
| 3 | | $F_1(N+1,N+2)$ | — |
| 4 | $F_2(N+1,N+2)$ | — | $F_2(N,N+1)$ |
| 5 | | $F_1(N+2,N+3)$ | — |
| 6 | $F_2(N+2,N+3)$ | — | $F_2(N+1,N+2)$ |

During timeslot 1 the motion estimator 104 of the image processor 101 is calculating a motion vector field $F_1(N,N+1)$ of image pair N,N+1 while the external unit 108 is calculating a motion vector field $F_2(N-1,N)$ of image pair N-1,N. During timeslot 2 the motion compensation unit 106 of the image processor 101 is using the motion vector field $F_2(N-1,N)$ of image pair N-1,N while the external unit 108 is calculating a motion vector field $F_2(N,N+1)$ for image pair N,N+1. Notice that in this example the external unit 108 can spend more time on calculating a motion vector field than the image processor can spend. Taking also into account that in most cases only a portion of the motion vector field requires an improvement then it is convincing that the two pass mode results in improved image quality.

FIG. 4 schematically shows an image display apparatus 400 according to the invention comprising:
   a receiver 402 for receiving a sequence of images. The images may be broadcasted and received via an antenna or cable but may also come from a storage device like a VCR (Video Cassette Recorder) or DVD (Digital Versatile Disk). The sequence of images is provided at the input connector 406 of the image display apparatus 400. Image sequences come in various image rates: film material in 24, 25 and 30 Hz and video usually in 50 Hz and 60 Hz;
   an image processor 101 implemented as described in connection with FIG. 1B; and
   a display device 404 for displaying images. The type of the display device 404 may be e.g. a CRT, LCD or PDP. The display device 404 can operate with image rates of 50, 60 or 100 Hz and can have either progressive or interlaced scanning.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. An image processor for motion compensated image processing, comprising:
   a memory unit for storing a first input image and a second input image;
   a motion estimator for estimating a motion vector field based on the first input image and the second input image; and
   a motion compensation unit for calculating an output image based on a further motion vector field and based on the first input image and the second input image, characterized in that said motion compensation unit selectively receives the further motion vector field from the motion estimator or from
   an external unit.

2. The image processor as claimed in claim 1, characterized in that the image processor provides the motion vector field to the external unit, said external unit calculating the further motion vector field on the basis of the motion vector field.

3. The image processor as claimed in claim 2, characterized in that the external unit recalculates a particular motion vector of the motion vector field.

4. The image processor as claimed in claim 2, characterized in in that the image processor further comprises a switch
   having a first input coupled to the motion estimator,
   a second input coupled to the external unit, and an output coupled to the motion compensation unit, the switch having a first state in which the first input is connected to the output, and a second state in which the second input is connected to the output.

5. The image processor as claimed in claim 2, characterized in that the motion estimator comprises a first control interface for enabling and/or disabling the motion estimator.

6. The image processor as claimed in claim 2, characterized in that the motion compensation unit comprises a second control interface for enabling and/or disabling the motion compensation unit.

7. The image processor as claimed in claim 1, characterized in that the motion compensation unit performs at least one of the following operations:
de-interlacing,
temporal image interpolation, or
temporal noise reduction.

8. An image display apparatus comprising:
a receiver for receiving a sequence of images comprising a first input image and a second input image;
an image processor for motion compensated image processing, comprising:
a memory unit for storing the first input image and the second input image;
a motion estimator for estimating a motion vector field based on the first input image and the second input image; and
a motion compensation unit for calculating an output image based on a further motion vector field and based on the first input image and the second input image; and
a display device for displaying the output image, characterized in that the image processor selectively receives the further motion vector field from
the motion estimator, or from
an external unit.

9. The image display apparatus as claimed in claim 8, characterized in that that the image processor provides the motion vector field to the external unit, the external unit calculating the further motion vector field on the basis of the motion vector field.

10. The image display apparatus as claimed in claim 8, characterized in that the motion compensation unit performs at least one of the following operations:
de-interlacing,
temporal image interpolation, or
temporal noise reduction.

* * * * *